US011618355B2

(12) United States Patent
Hill

(10) Patent No.: US 11,618,355 B2
(45) Date of Patent: Apr. 4, 2023

(54) LOW PROFILE ADJUSTABLE VEHICLE SEAT MOUNT ASSEMBLY

(71) Applicant: Milsco, LLC, Milwaukee, WI (US)

(72) Inventor: Kevin E. Hill, Milwaukee, WI (US)

(73) Assignee: MILSCO, LLC, Milwaukee, WI (US)

( * ) Notice: Subject to any disclaimer, the term of this patent is extended or adjusted under 35 U.S.C. 154(b) by 0 days.

(21) Appl. No.: 16/443,180

(22) Filed: Jun. 17, 2019

(65) Prior Publication Data

US 2019/0381916 A1    Dec. 19, 2019

Related U.S. Application Data

(60) Provisional application No. 62/685,521, filed on Jun. 15, 2018.

(51) Int. Cl.
*B60N 2/50* (2006.01)
*B60N 2/005* (2006.01)
*B60N 2/54* (2006.01)
*B60N 2/16* (2006.01)

(52) U.S. Cl.
CPC ............ *B60N 2/505* (2013.01); *B60N 2/005* (2013.01); *B60N 2/162* (2013.01); *B60N 2/1675* (2013.01); *B60N 2/502* (2013.01); *B60N 2/544* (2013.01)

(58) Field of Classification Search
CPC ...... B60N 2/505; B60N 2/162; B60N 2/1675; B60N 2/1615; B60N 2/502; B60N 2/544; B60N 2/506; B60N 2/507; B60N 2/508; B60N 2/54; B60N 2/546; B60N 2/548
See application file for complete search history.

(56) References Cited

U.S. PATENT DOCUMENTS

| | | | | |
|---|---|---|---|---|
| 3,774,711 A | * | 11/1973 | Lacey | .................... B60N 2/502 180/329 |
| 3,908,953 A | * | 9/1975 | Miller | .................... B60N 2/506 248/421 |
| 3,957,304 A | * | 5/1976 | Koutsky | .............. B60N 2/4249 297/468 |
| 3,984,078 A | * | 10/1976 | Sturhan | .................. B60N 2/508 248/588 |

(Continued)

FOREIGN PATENT DOCUMENTS

| | | | |
|---|---|---|---|
| CN | 104401240 | 3/2015 | |
| FR | 2418721 A1 | * 9/1979 | ............... B60N 2/39 |

(Continued)

*Primary Examiner* — Kyle J. Walraed-Sullivan
(74) *Attorney, Agent, or Firm* — Boyle Fredrickson S.C.

(57) ABSTRACT

A vehicle seat mounting system includes a seat mount plate and a vehicle mount plate. A vertically operable scissor linkage assembly is disposed between the seat mount plate and the vehicle mount plate and is oriented such that respective opposing ends of a first scissor arm and a second scissor arm are each secured to a respective one of the seat mount plate and the vehicle mount plate. A spring assembly is disposed between the seat mount plate and the vehicle mount plate and is oriented to cooperate with the scissor linkage assembly to resist translation between the vehicle mount plate and the seat mount plate. An adjuster assembly cooperates with the spring assembly and is operable to manipulate the proportion of the spring assembly that is available to be engaged to resist motion of the mounting system.

35 Claims, 8 Drawing Sheets

(56) References Cited

U.S. PATENT DOCUMENTS

| | | | | |
|---|---|---|---|---|
| 4,034,948 A * | 7/1977 | Brownell | B60N 2/1615 | 248/585 |
| 4,072,287 A * | 2/1978 | Swenson | B60N 2/502 | 248/421 |
| 4,093,197 A * | 6/1978 | Carter | A47C 3/025 | 267/131 |
| 4,295,627 A * | 10/1981 | Graves | B60N 2/505 | 248/588 |
| 4,312,491 A * | 1/1982 | Aondetto | B60N 2/502 | 248/575 |
| 4,382,573 A * | 5/1983 | Aondetto | B60N 2/072 | 248/561 |
| 4,448,386 A * | 5/1984 | Moorhouse | B60N 2/502 | 248/564 |
| 4,471,934 A * | 9/1984 | Meiller | B60N 2/502 | 248/575 |
| 4,494,794 A * | 1/1985 | Barley | B60N 2/502 | 297/307 |
| 4,822,094 A * | 4/1989 | Oldfather | B60N 2/501 | 248/421 |
| 5,211,369 A * | 5/1993 | Hoerner | B60N 2/502 | 248/588 |
| 5,222,709 A * | 6/1993 | Culley, Jr. | B60N 2/502 | 248/421 |
| 5,364,060 A * | 11/1994 | Donovan | B60N 2/502 | 248/421 |
| 5,388,801 A * | 2/1995 | Edrich | B60N 2/502 | 248/421 |
| 5,580,027 A * | 12/1996 | Brodersen | B60N 2/502 | 248/162.1 |
| 5,765,803 A * | 6/1998 | Graham | B60N 2/0868 | 248/624 |
| 5,794,911 A * | 8/1998 | Hill | B60N 2/502 | 248/419 |
| 5,799,922 A * | 9/1998 | Timms | B60N 2/501 | 248/564 |
| 5,876,085 A * | 3/1999 | Hill | B60N 2/542 | 296/65.02 |
| 5,927,679 A * | 7/1999 | Hill | B60N 2/544 | 248/588 |
| 5,950,977 A * | 9/1999 | Proksch | B60N 2/508 | 248/421 |
| 5,954,400 A * | 9/1999 | Brodersen | B60N 2/505 | 297/339 |
| 5,957,426 A * | 9/1999 | Brodersen | B60N 2/544 | 248/588 |
| 6,120,082 A * | 9/2000 | Vandermolen | B60N 2/02 | 248/550 |
| 6,550,740 B1 * | 4/2003 | Burer | B60N 2/502 | 248/370 |
| 6,554,359 B2 | 4/2003 | Kohl et al. | | |
| 6,644,737 B2 | 11/2003 | Kohl et al. | | |
| 2002/0024244 A1* | 2/2002 | Kohl | B60N 2/505 | 297/338 |
| 2002/0190560 A1 | 12/2002 | Kohl et al. | | |
| 2003/0201660 A1* | 10/2003 | Janscha | B60N 2/504 | 297/216.17 |
| 2004/0144906 A1* | 7/2004 | Hill | B60N 2/505 | 248/421 |
| 2004/0211873 A1* | 10/2004 | Gryp | B60N 2/085 | 248/429 |
| 2005/0001133 A1* | 1/2005 | Bostrom | B60N 2/0825 | 248/419 |
| 2006/0237885 A1* | 10/2006 | Paillard | B60N 2/508 | 267/140.15 |
| 2007/0295882 A1* | 12/2007 | Catton | B60N 2/508 | 248/588 |
| 2008/0088165 A1* | 4/2008 | Deml | B60N 2/501 | 297/344.12 |
| 2010/0072800 A1* | 3/2010 | Weber | B60N 2/508 | 297/344.15 |
| 2011/0001033 A1* | 1/2011 | Kohl | B60N 2/505 | 248/575 |
| 2011/0001342 A1* | 1/2011 | Demi | B60N 2/544 | 297/338 |
| 2011/0204684 A1* | 8/2011 | Forsman | B60N 2/508 | 297/216.1 |
| 2011/0226930 A1* | 9/2011 | Enns | B60N 2/508 | 248/569 |
| 2011/0241391 A1* | 10/2011 | Lamparter | B60N 2/24 | 297/216.1 |
| 2011/0298266 A1* | 12/2011 | Haller | B60N 2/501 | 297/344.12 |
| 2012/0001467 A1* | 1/2012 | Teufel | B60N 2/0232 | 297/337 |
| 2012/0001468 A1* | 1/2012 | Schuler | B60N 2/525 | 297/344.16 |
| 2013/0206949 A1* | 8/2013 | Archambault | B60N 2/508 | 248/421 |
| 2013/0270031 A1* | 10/2013 | Hahn | B60N 2/508 | 180/337 |
| 2013/0306825 A1* | 11/2013 | Brodersen | B60N 2/507 | 248/419 |
| 2014/0091191 A1* | 4/2014 | Romera Carrion | A47C 3/20 | 248/421 |
| 2015/0008072 A1* | 1/2015 | Knox | B60N 2/1685 | 182/141 |
| 2015/0021965 A1* | 1/2015 | Ellerich | B60N 2/01566 | 297/283.1 |
| 2015/0231992 A1* | 8/2015 | Gundall | B60N 2/508 | 297/344.15 |
| 2015/0232004 A1* | 8/2015 | Haller | B60N 2/164 | 248/562 |
| 2015/0232005 A1* | 8/2015 | Haller | B60N 2/525 | 248/562 |
| 2015/0300785 A1* | 10/2015 | Lamparter | B60N 2/643 | 297/216.17 |
| 2016/0207430 A1* | 7/2016 | Haller | B60N 2/0232 | |
| 2016/0214658 A1* | 7/2016 | Haller | B60N 2/522 | |
| 2017/0305312 A1* | 10/2017 | Haller | B60N 2/508 | |
| 2019/0009697 A1* | 1/2019 | Lorey | B60N 2/522 | |
| 2020/0001750 A1* | 1/2020 | Fillep | B60N 2/508 | |
| 2020/0108750 A1* | 4/2020 | Dotzler | B60N 2/38 | |
| 2021/0009010 A1* | 1/2021 | Haller | B60N 2/162 | |

FOREIGN PATENT DOCUMENTS

| | | |
|---|---|---|
| JP | 2010168005 | 8/2010 |
| KR | 10-1998-0074019 | 11/1998 |

* cited by examiner

LOW PROFILE ADJUSTABLE VEHICLE SEAT MOUNT ASSEMBLY

CROSS REFERENCE TO RELATED PATENTS

This application claims priority to U.S. Provisional Patent Application Ser. No. 62/685,521 titled "Low Profile Adjustable Dampening Seat Mount Assembly" filed on Jun. 15, 2018, the entire disclosure of which is expressly incorporated herein.

FIELD OF THE INVENTION

The present invention is directed to an adjustable vehicle seat mount assembly and, more particularly, to a seat mount assembly of low-profile construction equipped with a seat suspension system capable of adjustment for seat occupant mass or weight.

BACKGROUND

Most vehicle seats employ a seat mount assembly that can be a preassembled modular subassembly located between the seat and a vehicle in which the seat is mounted. Vehicle seat mount assemblies are provided having a variety of sizes, shapes, and features configured for the intended vehicle or seating application. For vehicle seating applications for larger vehicles where vehicle seat packaging space is not significantly constrained, the vehicle seats are not only larger, but the seat mounts used to attach the seats to vehicles are also larger. Use of such larger seat mounts accommodates use of larger, more complex, robust seat suspension systems configured not only to provide weight adjustment but also height adjustment. Quite often, such greater seat packaging volume enables the seat or mount to be equipped with fore-aft position adjusters that enable adjustment of fore-aft seat position.

Whereas larger vehicles, such as automotive and over the road vehicles, commonly include more robust vehicle seat and vehicle frame suspension systems configured to isolate seat occupants, including a vehicle operator, from shocks, bumps, jolts, and vibrations encountered during vehicle operation, such vehicle and seat suspension systems are commonly ill-suited for use in smaller vehicles and other space-constrained vehicle seating applications. Because vehicle seating packaging space is so limited in smaller vehicles and space-limited applications, smaller low-profile seat mounts are used that often are so small that there is insufficient space for any seat suspension system to be used.

For instance, smaller off-road vehicles, such as skid and track loaders and hoes are commonly used in a number of industries. The operation of such machines, and the hydraulic systems associated therewith, limits the size, complexity and robustness of the vehicle frame suspension that can be provided thereby limiting how much the operator can be isolated from shocks, impacts, bumps and jolts encountered during use and operation of such off-road vehicles. Similarly, lawn tractors and mowers, such as the prevalent zero-turn mower configuration, are known to possess limited operator comfort because these types of off-road vehicles are commonly equipped with only a rudimentary vehicle frame suspension or even no vehicle frame suspension whatsoever as cutting can otherwise be detrimentally affected.

The above can be affected and further complicated by the weight or mass of the operator. Whereas some such machines provide only limited impact isolation between the operator and the underlying machines, other machines are equipped with more complicated vibration isolation systems frequently disposed between the operator seat and vehicle frame. Still further, some such systems provide only limited or no adjustment associated with operation of the vibration isolation systems and/or are unable to adequately accommodate operators of different sizes and weights. The limited or lack of adjustability of such systems results make them inadequate or incapable of addressing differences in discrete user preferences such that they are ill-equipped to provide a desired degree of comfort or level of performance that accommodates seat occupants, typically vehicle operators, of different sizes, heights, weights, and shapes.

Still further, such machines commonly require some degree of fore-aft adjustment of the seat relative to the operator space and the various discrete vehicle control systems associated therewith. In the past, relatively simple seat mount and fore—aft seat position adjustment arrangements have been constructed of numerous components that require a considerable number of manufacturing steps that have tended to make them increasingly cost-prohibitive. Further, the relative degree of fore-aft adjustability of such seat mounting systems require more horizontal fore and aft space, as well as vertically dimensioned space, associated with accommodating such systems than is customarily available in such off-road equipment.

Although a number of automotive vehicle seat mounting systems can be provided to accommodate a large range of user performance preferences, off-road equipment is commonly constructed in a manner wherein application of automotive seat vibration isolation mounting systems are ill-suited for cooperation therewith. Skid loaders, zero-turn mowers, etc., are commonly constructed in a manner wherein overhead protection of the user or operator is provided and is generally provided in relatively close proximity to the operator so as to protect the operator during tipping events and/or from downwardly directed impacts.

The construction of the operator cabin or cage and/or roll over protection structure (ROPS) is commonly provided in close but tolerable spaced proximity to the operator to reduce the pass through clearance dimensions associated with operation of the underlying machine. Such close spatial proximity of the cabin or the ROPS relative to the head of the operator provides only limited vertical space associated with vertical operation of a vehicle seat mounting assembly for vibration isolation performance. Such considerations substantially negate the ability to utilize automotive vehicle seat mounting arrangements for vibration isolation performance in such off-road equipment wherein the spatial limitations defined by the construction of the underlying machine substantially limit the space available for mounting of the seat assembly. Further still, the vertical adjustability and vibration isolation compliance associated with such seat mount assemblies frequently translates the center of gravity (COG) attributable to common user size to distances that are less preferred or wholly unacceptable to the manufacturers of such vehicles.

Accordingly, there is a need for a vehicle seat mount system that can accommodate fore and aft adjustment of the seat relative to the underlying vehicle and which is constructed to provide user adjustable load tolerance between the seat and the underlying vehicle and does so in a compact form factor and in a manner that can be quickly and economically implemented across a plurality of vehicle configurations.

SUMMARY OF INVENTION

The present invention is directed to a vehicle seat mount assembly, suspension system, and method that addresses one or more of the drawbacks discussed above and which is particularly well suited and configured for use in vehicle seating applications where there is limited seating space. At least one embodiment of the present invention is directed to a compact, low-profile vehicle seat mount assembly that includes a seat suspension system configured to provide seat occupant weight adjustability.

The seat mount assembly has a pair of mount plates with one of the mount plates being a seat mount plate carrying the vehicle seat and the other one of the mount plates being a vehicle mount plate anchoring the seat and mount assembly to a frame or chassis of the vehicle. The seat mount assembly has a seat suspension system in operable cooperation with the seat mount plates and that is configured to support the weight of a seat occupant, e.g., operator, while also isolating the seat occupant from impacts, jolts, shocks, bumps and vibration encountered during vehicle operation. The mounting plates are operatively linked or connected to one another in a manner permitting relative movement therebetween in response to suspension operation during vehicle operation. In a preferred embodiment, relative movement between the mount plates is guided during suspension operation by a linkage arrangement that preferably is a scissors linkage arrangement.

The suspension system includes a resilient biasing arrangement in operable cooperation with the mount plates opposing relative movement between the mount plates during vehicle operation supporting the weight of the seat occupant and providing isolating from impacts, jolts, shocks, bumps and vibration. The suspension system also includes a weight adjuster configured to selectively move or selectively displace the resilient biasing arrangement relative to one or both mount plates between at least a plurality, and preferably a plurality of pairs, i.e., at least three, weight adjust positions that provide increased resistance to weight of the weight occupant.

In a preferred embodiment, the resilient biasing arrangement of the seat suspension is operatively connected to the mount plates and opposes relative movement of one of the mount plates toward the other one of the mount plates during suspension system operation during vehicle operation. A preferred resilient biasing arrangement includes a plurality of springs that are disposed between the mount plates in operable cooperation therewith. One such preferred resilient biasing arrangement has springs captured in compression between the mount plates and that opposes relatively movement of the mount plates toward one another during suspension operation during vehicle operation.

The weight adjuster of the seat suspension includes a resilient biasing arrangement positioner that moves a position of the resilient biasing arrangement relative to a location of operative contact or operable coupling with one or both mount plates between a plurality of, preferably a plurality of pairs of, i.e., at least three, weight adjust positions that change the available resistive force of the resilient biasing arrangement acting against the mount plates. A preferred weight adjuster displaces the resilient biasing arrangement between its weight adjust positions by moving the resilient biasing arrangement in a direction generally parallel to one or both mount plates to change the amount of suspension force opposing the weight of the seat occupant. One such preferred weight adjuster moves the resilient biasing arrangement between weight adjust positions by translating the resilient biasing arrangement in one or both of a fore-aft and/or side-to-side direction relative to the mount plates and which can also substantially simultaneously rotate the resilient biasing arrangement relative thereto to provide seat occupant weight adjustment.

One aspect of the present application discloses a vehicle seat mount assembly having a seat mount plate and a vehicle mount plate. A vertically operable scissor linkage assembly is disposed between the seat mount plate and the vehicle mount plate and is oriented such that respective opposing ends of a first scissor arm and a second scissor arm are each secured to a respective one of the seat mount plate and the vehicle mount plate. A spring assembly is disposed between the seat mount plate and the vehicle mount plate and is oriented to cooperate with the scissors linkage assembly to attenuate motion between the seat and the vehicle. An adjuster assembly cooperates with the spring assembly and is operable to move the spring assembly to attenuate the suspension performance associated with operation of the spring assembly.

Another aspect of the application that is useable or combinable with one or more of the features or aspects disclosed above discloses a seat mount assembly that includes a lower housing that is constructed to be secured to a vehicle frame member and an upper housing constructed to be secured to a seat. The mounting assembly includes an asymmetric scissor assembly that includes a first scissor arm or bracket that is pivotably secured to a second scissor arm or bracket. Opposing ends of the first scissor arm and the second scissor arm are secured to a respective one of the lower housing and the upper housing. A resilient biasing arrangement or spring assembly is disposed within a footprint of the asymmetric scissor assembly and is configured to be movable relative thereto. An adjuster assembly cooperates with the spring assembly and is configured to manipulate the position of the spring assembly relative to the mounting assembly to provide multiple proportional engagements of the spring assembly.

A further aspect of the present application that is useable or combinable with one or more of the above features or aspects discloses a low profile seat mount assembly having an adjustable position resilient biasing arraignment or spring system. The seat mount system includes a vehicle facing mount plate, a seat facing mount plate and a first pivot arm or bracket and a second pivot arm or bracket that are disposed between the vehicle facing mount plate and the seat facing mount plate. The first pivot arm or bracket and the second pivot arm or bracket are pivotably connected to one another to define a pivot axis that is oriented proximate a middle portion each of the first pivot bracket and the second pivot bracket. A spring assembly is disposed between at least one of the vehicle facing mount plate and the seat facing mount plate and at least one of the first pivot arm or bracket and the second pivot arm or bracket. In a preferred aspect, the spring assembly is configured to act upon a scissors assembly or scissors arrangement that is disposed between the vehicle facing mount plate and the seat facing mount plate. The spring assembly is configured to resist translation of the vehicle facing mount plate toward the seat facing mount plate during loading by a user. An adjuster preferably cooperates with the spring assembly and is configured to manipulate the proportion of the spring assembly that is engaged to resist the translation of the vehicle facing mount plate toward the seat facing mount plate as function of the discrete position of the spring assembly.

Another aspect of the present application that is usable or combinable with one or more of the above aspects or features discloses a method for forming a low-profile seat mount assembly. The method includes providing a first scissor arm and a second scissor arm that are securable to respective opposite fore/aft ends of a seat mounting plate. The first scissor arm and the second scissor arm are connected to one another such that the first scissor arm and the second scissor arm are securable to respective opposite fore/aft ends of a vehicle mounting plate and such that the first scissor arm and the second scissor arm are oriented in a crossing orientation relative to the one another with respect to a lateral side elevation of the first scissor arm and the second scissor arm. A spring cartridge is provided that modulates translation performance between the first scissor arm and the second scissor arm and is configured to be disposed therebetween. An adjuster assembly cooperates with the spring cartridge and is operable to manipulate a position of the spring cartridge relative to the first scissor arm and the second scissor arm.

Another aspect of the present application that is useable or combinable with one or more of the features or aspects disclosed above includes providing an adjustable performance seat mounting system that includes a spring assembly that cooperates with a driver that is configured to be manipulated by an occupant associated with the seat and a driven member that is oriented to interact with the spring assembly and manipulate a position of the spring assembly relative to the seat mounting assembly or an effectivity or degree of available engagement of the spring assembly. The driver and driven member are oriented relative to one another such that translation or rotation of the driver by the occupant effectuates translation of the driven member to effectuate linear, axial, rotational, lateral, and/or rotational and translational motion of the spring assembly, and preferably at least a pair of springs associated therewith, so as to manipulate a proportion of the at least one spring engaged in supporting the operator.

In another preferred aspect of the present invention, the spring assembly is provided as a cartridge that includes at least one spring captured between respective upper and lower spring plates. At least one, and preferably two, tethers secure the respective upper and lower spring plates relative to one another when the spring(s) is/are captured therebetween such that the cartridge can be conveniently disposed between a seat facing support plate and a vehicle facing support plate. The cartridge is configured to cooperate with a driven member when disposed between the seat mount assembly and which is oriented to manipulate a position of the cartridge relative to the seat mount assembly.

Each of the aspects and features of the present application as disclosed above provide a seat mounting system that is provided in a compact form factor and is configured to provide adjustability of the load performance to satisfy the discrete preferences of a user and in a manner that mitigates fore and aft as well as lateral translation of the seat relative to the underlying vehicle attributable to the seat mounting system. These and various other aspects, features, and advantages of the present invention can be appreciated from the following brief description of the drawings, detailed description, appending claims and enclosed drawings.

BRIEF DESCRIPTION OF THE DRAWINGS

Preferred exemplary embodiments of the invention are illustrated in the accompanying drawings in which like reference numerals represent like parts throughout and in which.

Figure 1:
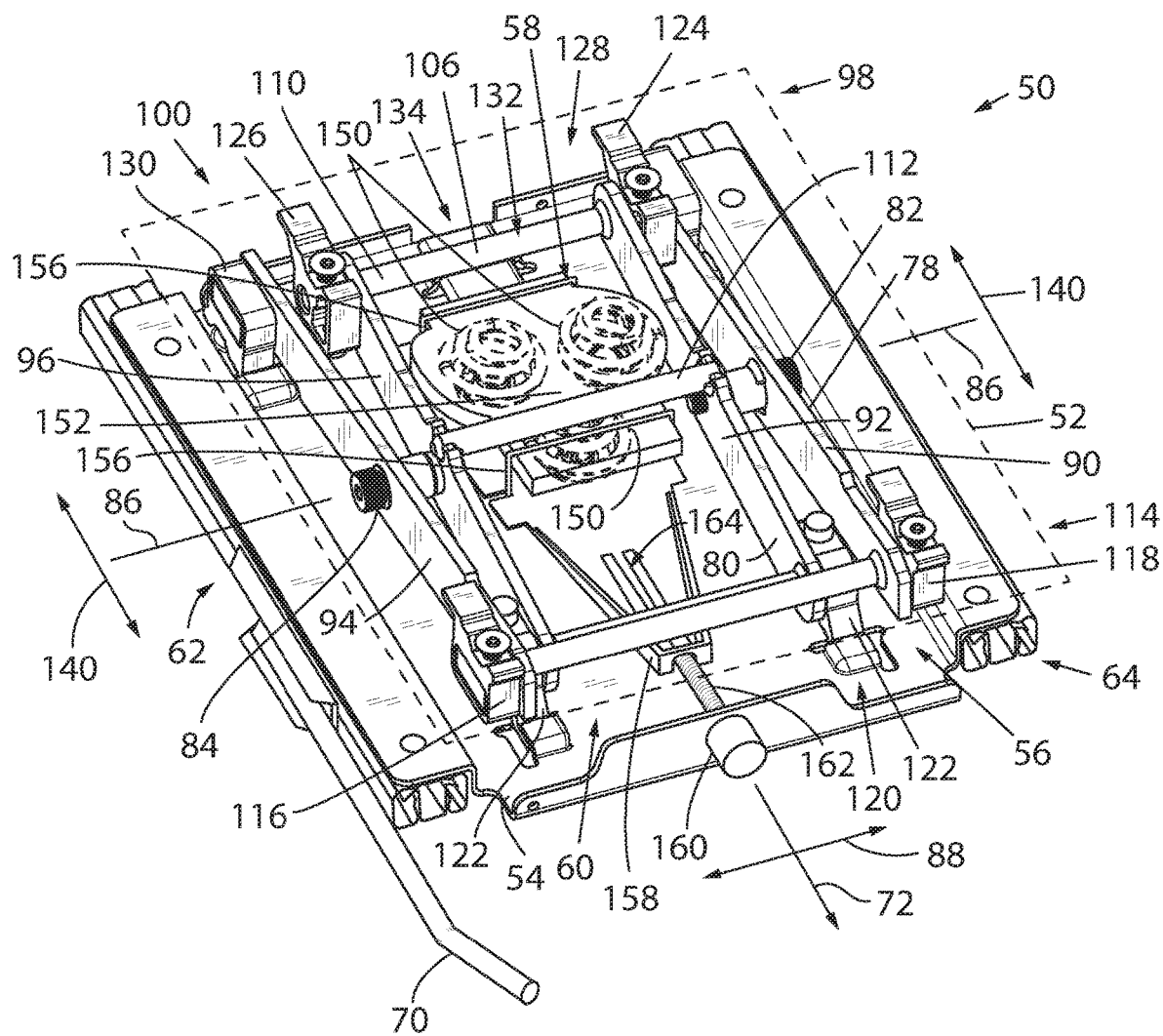
FIG. 1 is an isometric view of a seat mount suspension system according to one embodiment of the present invention and having a variable position spring assembly and a screw-type spring assembly position adjusting assembly.

Before explaining the one or more embodiments of the invention in detail below, it is to be understood that the invention is not limited in its application to the details of construction and the arrangement of the components set forth in the following description and illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION

Figure 2:
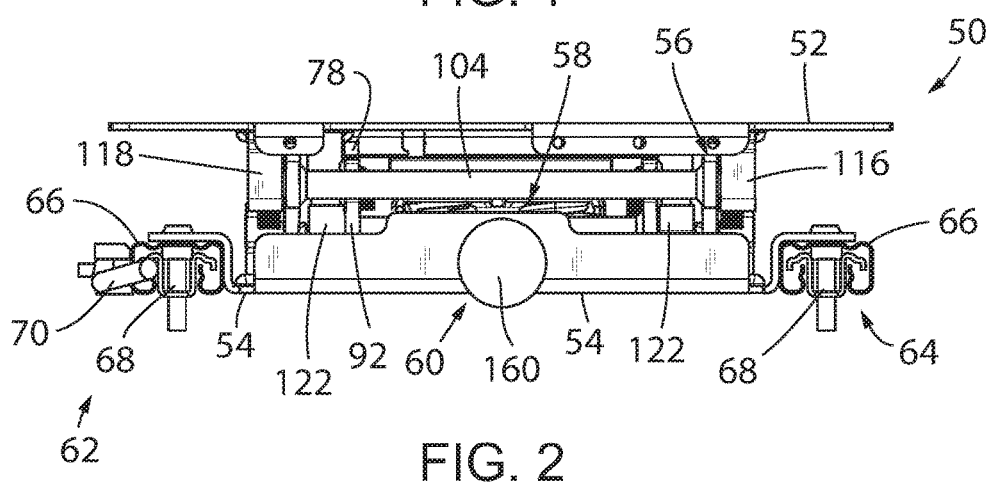
FIG. 2 is a front elevation view of the assembly shown in FIG. 1.

FIGS. 1 and 2 show a seat mount assembly 50 according to one embodiment of the present invention. Seat mount assembly 50 includes a seat facing mount plate or upper housing 52, a vehicle facing mount plate or lower housing 54, and a scissor linkage or scissor assembly 56 that is disposed between the respective upper and lower plate housings 52, 54. A spring system or assembly 58 is disposed between upper housing 52 and lower housing 54, whether directly or indirectly engaged therewith, is movable relative thereto and cooperates with scissor assembly 56 so as to manipulate the proportion of spring assembly that contributes to resist translation of a seat in a downward direction toward an underlying vehicle as disclosed further below.

An adjuster assembly 60 is supported by lower housing 54 and operable to manipulate a position or orientation of spring assembly 58 relative to scissors assembly 56. It is appreciated that the orientation of scissor assembly 56 and spring assembly 58 could be reversed relative to upper and lower housings 52, 54 without otherwise detracting from the desired performance of spring assembly 58 or proportion of spring assembly 58 that acts to attenuate compression of scissors assembly 56. Regardless of the relative orientations of scissor assembly 56 and spring assembly 58, lower housing 54 is preferably constructed to cooperate with one or more optional respective slide rail assemblies 62, 64 that are associated with the generally opposite lateral sides of seat mount assembly 50.

Each slide rail assembly 62, 64 includes a first rail 66 and the second rail 68 that are selectively slidable relative to one another. The handle of handle assembly 70 extends in a forward lateral direction relative to assembly 50, indicated by arrow 72, and is operable to effectuate the desired fore and aft longitudinal adjustment of seat mount assembly 50 relative to an underlying vehicle. It is appreciated that for applications wherein no such fore and aft adjustment is unnecessary or undesired, lower housing 54 may be secured directly to more rigid or frame structures associated with an underlying vehicle.

Referring to FIG. 1, scissor assembly 56 includes an inner or first scissor bracket, link, or arm 78 and an outer or second scissor bracket, link, or arm 80 that are pivotably connected to one another via respective pivot pins 82, 84 that define a respective pivot axis 86 that is oriented to extend in a lateral or right to left direction, indicated by arrow 88, relative to seat mount assembly 50. Scissor arms 78, 80 are each generally "link" shaped and include a plurality of discrete portions or arms that extend in fore and aft directions and which are connected to one another by one or more discrete cross members or cross bars that extend in a lateral direction between the discrete arms as disclosed further below.

Each scissor arm 78, 80 includes a respective first portion 90, 92 and a respective second portion 94, 96 that are associated with respective opposite lateral sides 98, 100 of seat mount assembly 50 and extend in a fore/aft direction associated with scissor assembly 56. First scissor arm 78 includes one or more cross bars or cross members 104, 106 that extend in lateral direction 88 between respective portions 90, 94 associated with first scissor arm 78.

In a similar manner, second scissor arm 80 includes a first cross bar or cross member 108 and a second cross bar or cross member 110 that extends between respective lateral portions 92, 96 of second scissor arm 80. Second scissor arm 80 includes a medial cross arm or cross member 112 that extends between respective portions 92, 96 of second scissor arm 80 generally between forward oriented cross member 108 and rearward oriented cross member 110. Cross member 112 is oriented to interact with or otherwise engage spring assembly 58 during use of seat mount assembly 50.

Referring to FIGS. 1 and 2, forward oriented portions 114 of first scissor arm 78 are pivotably secured to upper housing 52 by respective mount blocks 116, 118 associated with the generally opposite longitudinal ends of crossbar 104. As disclosed further below, end portions 114 of scissor arm 78 cooperates with mount blocks 116 so as to provide a pivotable or rotational as well as a limited degree of slideable translation relative thereto. Forward oriented end portions 120 of second scissor arm 80 are connected to lower housing 54 proximate cross bar 108 via respective mount blocks 122. Similar mount blocks 124, 126, 128, 130 are associated with the respective rearward facing ends 132, 134 associated with each of first and second scissor arms 90, 92.

Unlike the forward oriented mounting arrangement wherein first scissor arm 78 is attached to upper housing 52 and second scissor arm 80 is attached to lower housing 54 with a slideable and rotational connection therebetween, end portion 132 of second scissor arm 80 is connected to upper housing 52 via amount blocks 124, 126 and rearward oriented portion 134 of first scissor arm 78 is attached to lower housing 54 to define respective pivotable connections therebetween.

As disclosed further below, at least two of the respective end portions of each of first scissor arm 78 and second scissor arm 80 are preferably constructed to provide pivotable and translatable motion of the respective scissor arm 78, 80 relative to the respective upper housing 52 or lower housing 54 to which it is engaged and the additional two respective end portions associated with respective first scissor arm 78 and second scissor arm 80 provide only a pivotable connection therebetween. Such a consideration accommodates fore and aft relative translation, as indicated by arrow 140, of the respective discrete ends of scissor arms 78, 80 during vertical translation of upper housing 52 relative to lower housing 54 during use of seat mount assembly 50 and/or the suspension performance during engagement of the respective available proportion of spring assembly 58. That is, it is appreciated that both ends associated with one of first scissor arm 78 or second scissor arm 80, or one respective end of each of first scissor arm 78 and scissor arm 80 could be provided with the slideable and pivotable connection methodology to accommodate the fore and aft "contraction"/"expansion" of scissor assembly 56 during performance of seat mount assembly 50.

Still referring to FIG. 1, spring assembly 58 includes one or more, and preferably at least two discrete biasing devices 150, such as compression springs or the like, that are oriented between an upper spring plate 152 and the lower spring plate 154. One or more securing structures, such as one or more tethers 156, cooperate with springs 150 and/or upper and lower spring plates 152, 154 such that spring assembly 58 is formed as a cartridge or module that can be associated with the remainder of seat mount assembly 50. It is further appreciated that tethers 156 can cooperate with spring assembly 58 so as to provide a preload characteristic to the biasing devices 150 associated therewith. Spring assembly 58 slidably cooperates with lower housing 54 and interacts with cross member 112 associated with second arm 80 of scissor assembly 56 to effectuate vertical extension/retraction of scissor assembly 56 as the seat mount assembly 50 is subjected to loading and unloading due to the mass of the operator associated with use of the underlying vehicle and/or the seat associated with seat mount assembly 50.

Spring assembly 58, and the discrete biasing devices 150 associated therewith, provides adjustable resistance to the substantially vertical downward translation of upper housing 52 relative to lower housing 54 via manipulation of the position of the spring assembly 58 relative to the underlying seat mount assembly 50 to resist compression or compaction of the scissors assembly 56. In the embodiments shown in FIGS. 1-4, the position of spring assembly 58 relative to scissor assembly 56 is adjustable in a fore and aft axial or linear direction, and therefore relative to upper and lower housings 52, 54, to manipulate the contributions of discrete biasing devices 150 to resistance of downward translation of upper housing 52 relative to lower housing 54 as disclosed further below.

It is appreciated that the fore/aft linear translation of the respective spring assemblies relative to the underlying seat assembly is but one of many movement methodologies that can be employed so as to manipulate the relative proportions of the discrete springs that contribute to the resistance of the relative motion between the respective seat and vehicle supporting portions. For instance, it is appreciated that the respective spring assemblies could be configured to rotate about a generally vertical axis, rotate and translate relative to the underlying seat mount assembly, and translate in directions other than fore and aft directions to provide alternate relative engagements of the springs associated with the spring assembly. It is further appreciated that spring assemblies could be provided and supported in movable manners to allow selective engagement of one spring when in a first position, engagement of a pair of springs when oriented in a second position, engagement of another but different pair of springs when oriented in a yet another position, and/or engagement of discrete portions of more than one, two, or more springs when oriented in alternate positions as disclosed herein.

Adjuster assembly 60 is slideably supported by lower housing 54 and includes a driven element 158 and a drive element 160. A screw 162 extends between driving element 160 and driven element 158 and is constructed such that rotation of driving element 160 effectuates fore and aft translation, indicated by direction arrow 140, of driven element 158 relative to lower housing 54. Spring assembly 58 is supported by driven element 158 such that fore and aft translation of driven element 158 manipulates a point of incidence associated with the interaction between cross member 112 and spring assembly 58. Manipulating the location associated with the interaction between cross member 112 with spring assembly 58 adjusts the relative proportional contribution of the discrete biasing devices 150 to resisting translation of upper and lower housings 52, 54 toward each other.

Driven element 158 includes a reinforcement section 164 that is constructed to resist deflection of the driven element 158 in response to effectuating the desired fore/aft linear translation of the spring assembly 58. Operator manipulation of the handle associated with driving element 160 translates driven element 158 and thereby spring assembly 58 so as to manipulate the user or operator mass response configuration associated with interaction of the spring assembly 58 with scissor assembly 56.

As shown in FIG. 1, spring assembly 58 includes a pair of aft or rearward oriented biasing devices 150 and a singular fore or forward oriented biasing device 150 relative to a forward operating direction associated with the underlying vehicle. Forward relative position of cross member 112 relative to spring assembly 58 allows the forward oriented biasing device 150 to provide the minimum suspension performance contribution associated with engagement of spring assembly 58. Forward translation of spring assembly 58 relative to lower housing 54, and thereby the gradual more rearward positioning of cross member 112 of scissor assembly 56 relative to spring assembly 58, allows the aft or rearward oriented biasing devices 150 to gradually contribute a greater proportion of their discrete contributions to the resistance of downward translation of cross member 112 relative to lower housing 54 and in relation to any preload characteristic provided by tethers 156 as disclosed above. Said in another way, the adjustable orientation or position of spring assembly 58 relative to cross member 112 of scissor assembly 56 allows spring assembly 58 to contribute part or all of the potential energy associated with biasing devices 150 to resist the downward translation of upper housing 52 relative to lower housing 54 and thereby provides a continuously adjustable operator mass resistance performance of seat assembly 50 within the range of potential energy available from biasing devices 150. It is appreciated that spring assembly 58 can be provided in various configurations including spring assemblies having different numbers of discrete biasing devices. As disclosed further below, it is appreciated that providing spring assemblies have one or greater numbers of discrete biasing devices, can be provided in various configurations wherein the movement of the spring assembly relative to the upper and lower moveable portions of the discrete seat mount assemblies can be utilized to adjust the portion of the spring assembly that is available for engagement to resist the relative translation of the movable portions of the seat assembly. In a preferred aspect, biasing devices 150 are provided in a total number of biasing devices that is greater than 1.

Figure 3:
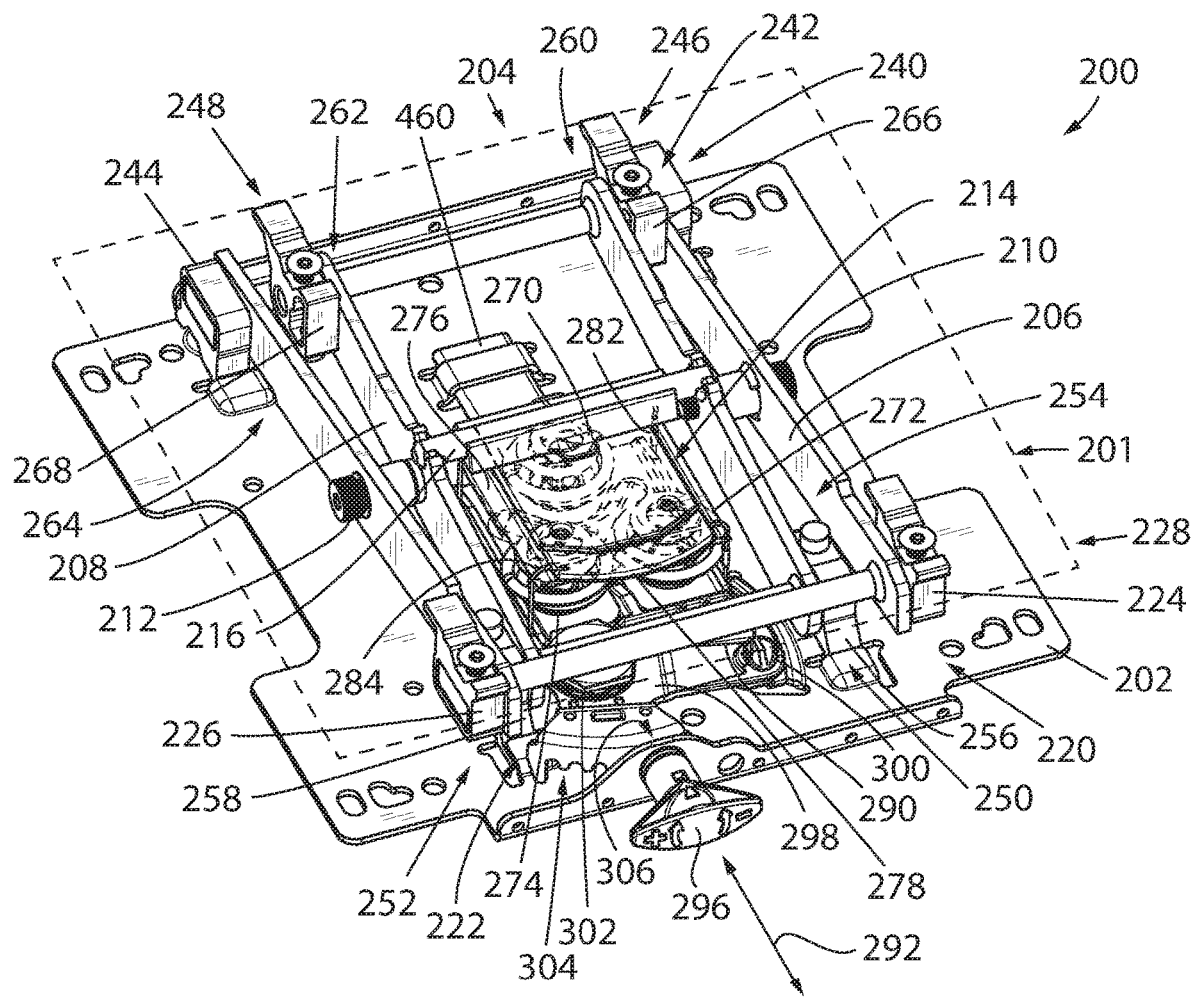
FIG. 3 is an isometric view a seat mount suspension system according to another embodiment of the invention having a variable position spring assembly and a rack and pinion-type spring assembly position adjusting assembly.
Figure 4:
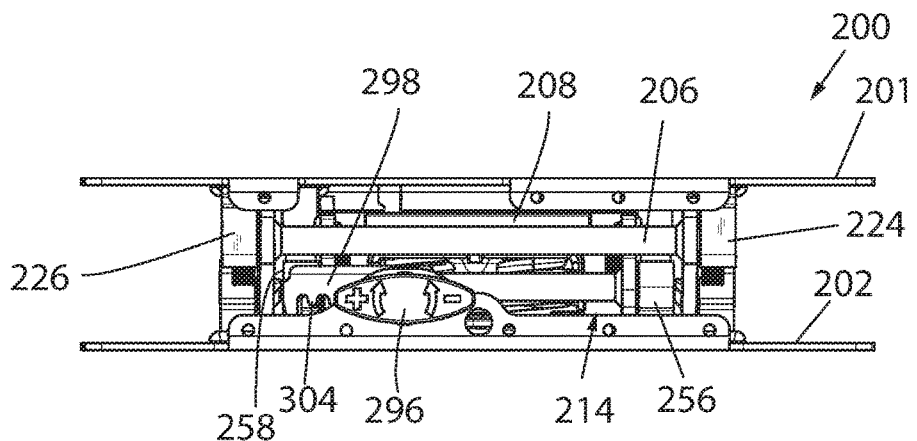
FIG. 4 is a front elevation view of the assembly shown in FIG. 4.

FIGS. 3 and 4 show exemplary views of a seat mount assembly 200 according to an alternate embodiment of the invention. Like seat mount assembly 50, seat mount assembly 200 includes an upper mount plate, frame, or upper housing 201 that is constructed to support a seat and a lower mount plate, frame, or lower housing 202 that is constructed to be secured to an underlying vehicle. A scissor assembly 204 that includes an outer or first scissor arm 206 and an inner or second scissor arm 208 are connected to one another via respective pivot assemblies 210, 212. A spring assembly 214 is disposed between respective scissor arms 206, 208 and is oriented to cooperate with a cross member 216 associated with second scissor arm 208. Opposing forward oriented lateral ends 220, 222 of first scissor arm 206 cooperate with respective pivot and/or pivot and slide blocks 224, 226 to accommodate pivotable and limited slidable translation of the forward oriented portions 228 of first scissor arm 206 relative to upper housing 201.

Rearward oriented end portion 240 of first scissor arm 206 is secured to lower housing 202 via opposing pivot blocks 242, 244 associated with the opposing lateral ends 246, 248 of first scissor arm 206. Blocks 242, 244 are also constructed to accommodate pivotable as well as limited slidable translation of respective ends 246, 248 of first scissor arm 206 relative to lower housing 202. Opposing end portions 250, 252 of forward oriented end portion 254 of second scissor arm 208 cooperate with respective pivot blocks 256, 258 that are attached to lower housing 202. Opposing ends 260, 262 of rearward oriented end portion 264 of second scissor arm 208 are pivotably secured to upper housing 201 by respective pivot blocks 266, 268.

Like spring assembly 58, spring assembly 214 is formed as a cartridge that is constructed to be disposed between cross member 216 of scissor assembly 204 and lower housing 202. Spring assembly 214 includes a plurality of discrete biasing devices, such as compression springs 270, 272, 274 or the like, that are captured between an upper spring plate 276 and a lower spring plate 278. Unlike spring assembly 58, spring assembly 214 includes two fore or forward oriented biasing devices and one aft or rearward oriented biasing device. One or more tethers or bands 282, 284 preferably maintain a selected preload of respective upper and lower spring plates 276, 278 with the one or more springs 270, 272, 274 captured therebetween.

Spring assembly 214 includes a carriage 290 that is slidable in a fore and aft direction 292 relative to lower housing 202 in response to operation of a handle or driving element 296. A driven element 298 is disposed between driving element 296 and carriage 290. A pivot 300 pivotably connects driven element 298 to carriage 290. Driven element 298 is pivotably secured via another pivot 302 between driven element 298 and lower housing 202. A rack 304 is defined by a portion of driven element 298 and cooperates with a pinion 306 associated with a rearward facing side of driving element 296. Rotation of driving element 296 effectuates rotation of driven element 298 about pivot 302. Cooperation of rack 304 and pinion 306 effectuates rotation of driven element 298 about pivot 302 relative to lower housing 202 and thereby effectuates the fore and aft 292 translation of spring assembly 214 relative to crossbar 216 of scissor assembly 204. As alluded to above with respect to assembly 50 and as disclosed further below with respect to FIGS. 8-11, the orientation of cross member 216 relative to spring assembly 214, and the asymmetric spring characteristics associated therewith due to the distribution of springs 270, 272, 274, manipulates the spring characteristics associated with operation of scissor assembly 204 and spring assembly 214 during use of seat mount assembly 200.

Figure 5:
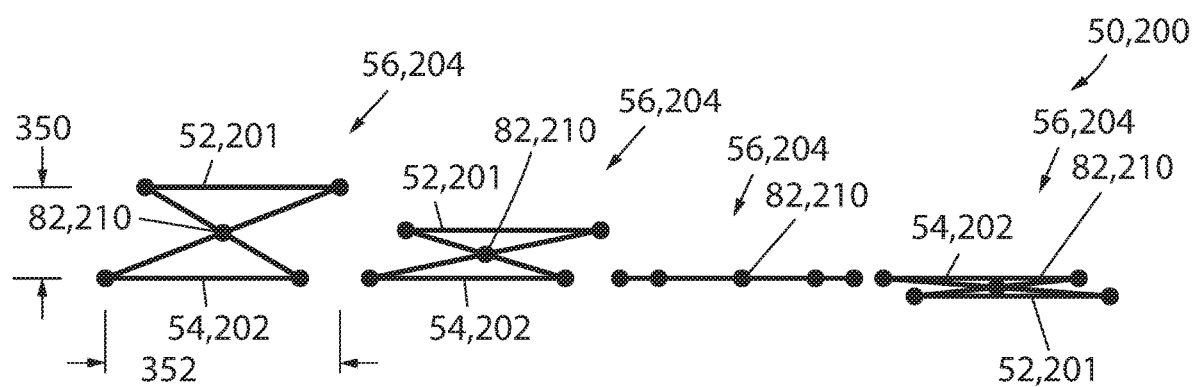
FIG. 5 is a graphic illustration showing the range of vertical and fore and aft translation of the asymmetric scissor assembly associated with operation of the seat mount systems shown in FIGS. 1-4.

FIG. 5 graphically represents a vertical operation, as indicated by dimension 350 of respective scissor assemblies 56, 204 and the relative fore/aft translation, indicated by dimension 353, during vertical loading of respective seat mount assemblies 50, 200 and/or the spring assemblies 58, 214 associated therewith over the range of motion and adjustment achievable therewith. Whereas the image on the left-hand side of FIG. 5 represents the unloaded configuration of scissor assemblies 56, 204, and thereby the most uncompressed condition of the discrete spring assembly associated with lighter mass users, the right-hand image represents the fully loaded condition associated with the respective spring assembly 58, 214 associated with the maximum compressed configuration of respective scissor assemblies 56, 204 during use thereof with users of greater mass.

It should be appreciated that during translation of respective scissor assemblies 56, 204 through their respective full range of motion between the unloaded and a fully loaded orientation and/or conditions associated with users of different masses, respective scissor assemblies 56, 204 can achieve orientations wherein the respective axis of rotation associated with the respective first and second scissor arms can effectively bypass one another so as to be oriented on generally opposite vertical sides of the discrete axis of rotation associated with pivot 82, 210 associated with the respective scissor assembly 56, 204 between an unloaded condition and a fully loaded condition associated with the respective seat mount assemblies 50, 200. It should be further appreciated that such ranges of motion can be achieved for users of various masses by manipulating the position of the discrete spring assemblies 58, 214 relative to the position of incidence with the respective scissors assembly such that a desired proportion of the respective spring assembly associated with resisting the translation of mounting assembly can be provided in a manner that is commensurate with or nearest proximate to the expected mass of the user.

It should further be appreciated that the discrete first and second arms of each scissor assembly 56, 204 are dissimilar or asymmetric relative to one another. Such considerations allow seat mount assemblies 50, 200 to be provided in a vertically compact form factor, have limited fore and aft translation of the respective upper housing relative to the respective lower housing attributable to operation of the seat mount system suspension performance, and provide a seat mount assembly that provides a quickly and easily adjustable suspension performance to satisfy the demands or preferences of users of various masses and preferences. Such considerations improve the user experience and allow users to withstand prolonged interaction and/or operation of vehicles over terrain as disclosed further below.

Figure 6:
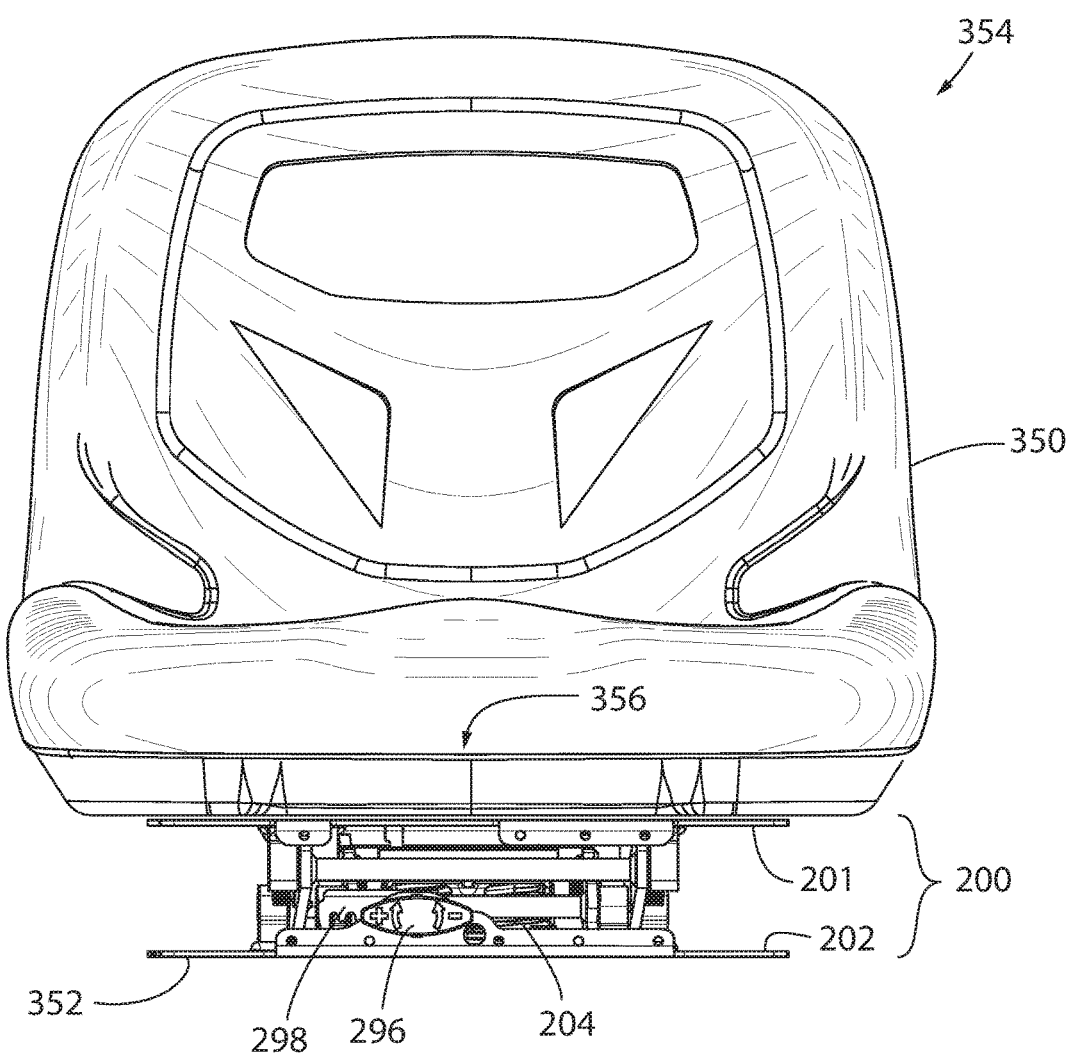
FIG. 6 is a view similar to FIG. 4 having a seat associated with the seat mount system shown therein.
Figure 7:
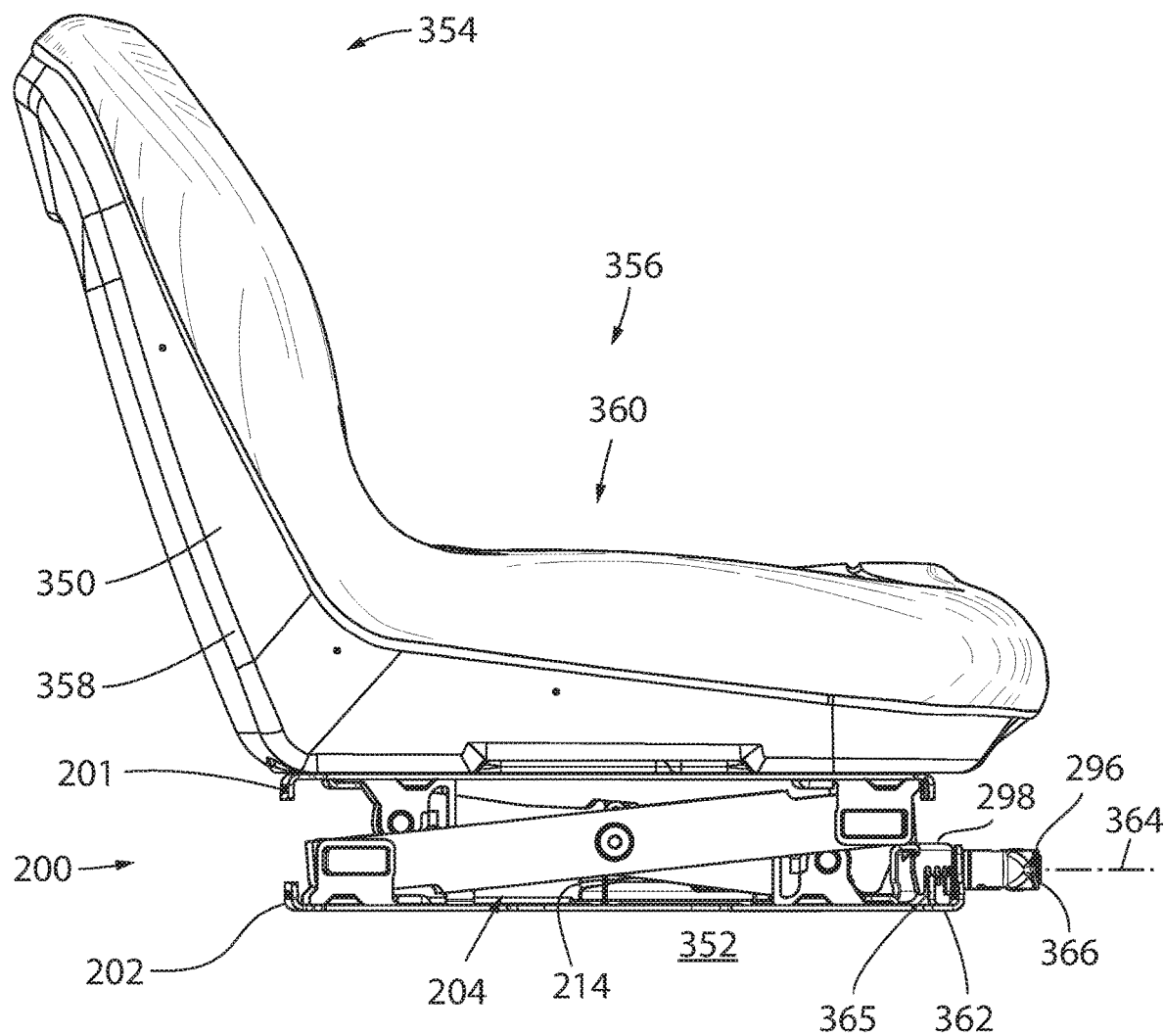
FIG. 7 is a side elevation view of the assembly shown in FIG. 6.

FIGS. 6 and 7 show a vehicle seat assembly 350 secured to the upper housing 201 of seat mount assembly 200. Lower housing 202 is constructed to be secured to a vehicle 352 disposed generally thereunder. It should be appreciated that lower housing 202 could be constructed to include or configured to cooperate with a slideable selectively adjustable rail assembly as disclosed above with respect to seat mount assembly 50.

Whether configured to include a slideable rail assembly or to be secured directly to the rigid vehicle platform or vehicle frame member, seat assembly 350 preferably includes a back portion 354 and a seat portion 356 that are oriented to support an operator relative to underlying vehicle 352. Seat assembly 350 may be provided in a generally unitary structure or may include a generally rigid exterior shell 358 configured to cooperate and/or otherwise be secured to upper frame 201 and a more pliable pad or cushion portion 360 disposed generally thereover.

Figure 12:
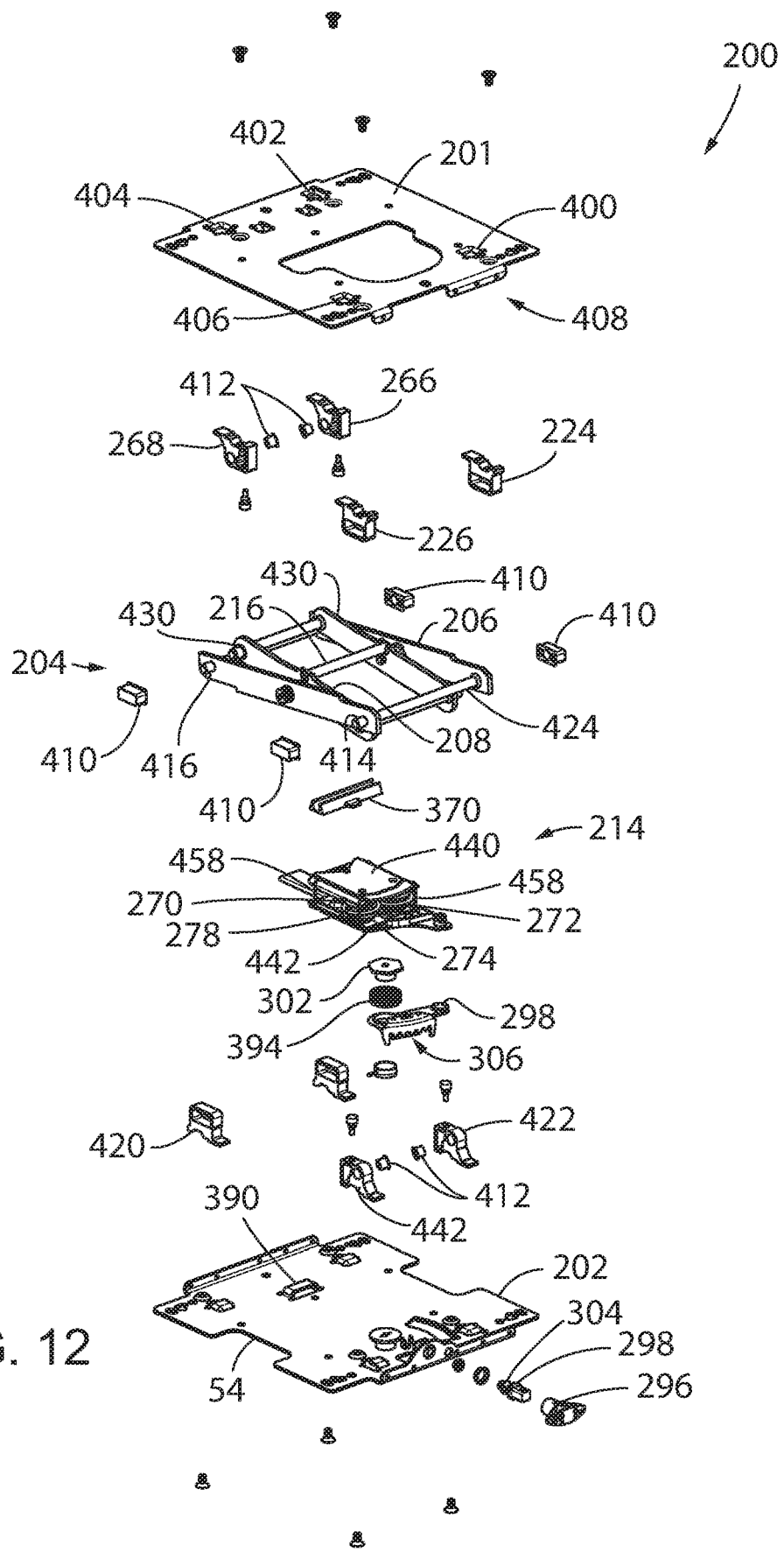
FIG. 12 is an exploded isometric view of the seat mount system shown in FIGS. 3 and 4.

Referring to FIG. 7, driving element or handle 296 is supported by a flange 362 defined by lower housing 202 so as to be rotatable about a generally horizontal axis, indicated by line 364, relative thereto and to effectuate the desired operation of driven element 298. Referring briefly to FIG. 12, one or more bushings 361 or bearings 363 and a retention clip 365 secure handle 296 relative to flange 362 and provide a secure yet rotational mounting arrangement therebetween and mitigate generation of noise therebetween. Referring back to FIG. 7, forward distal end 366 of handle 296 is preferably oriented slightly rearward and preferably not proud of a forward facing end 368 of seat assembly 350. Such a consideration presents handle 296 in a readily operable orientation relative to an operator seated upon seat assembly 350 and/or approaching from a forward oriented direction relative thereto.

Referring to FIGS. 8-11, the weight or suspension performance adjustment assembly associated with seat mount system 200 is translatable relative to upper housing 201, lower housing 202, and the axis associated with crossbar 216. Crossbar 216 preferably cooperates with a contact block or a slide 370 that slidably cooperates with an upper plate 380 associated with spring assembly 214 during translation thereof.

Figure 8:
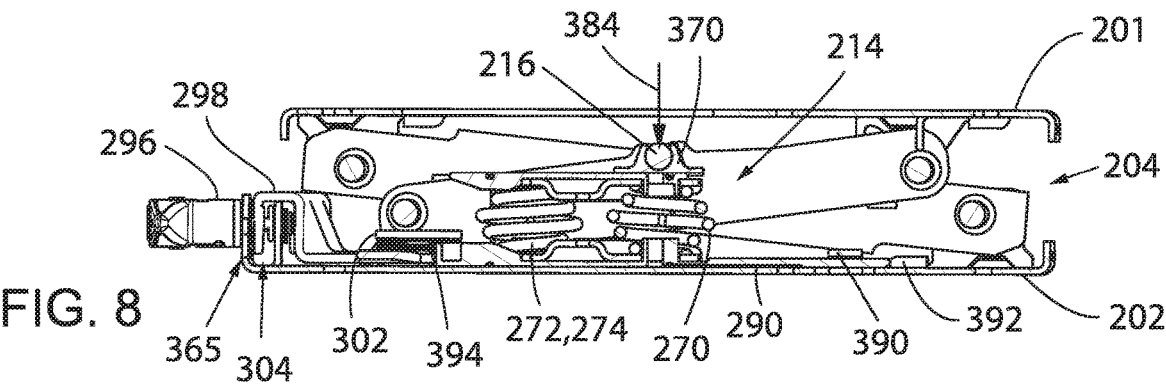
FIGS. 8-11 are various fore and aft centerline elevation cross section views of the seat mount assembly shown in FIGS. 3 and 4 and show the range of vertical motion associated with the seat suspension system shown therein.
Figure 9:
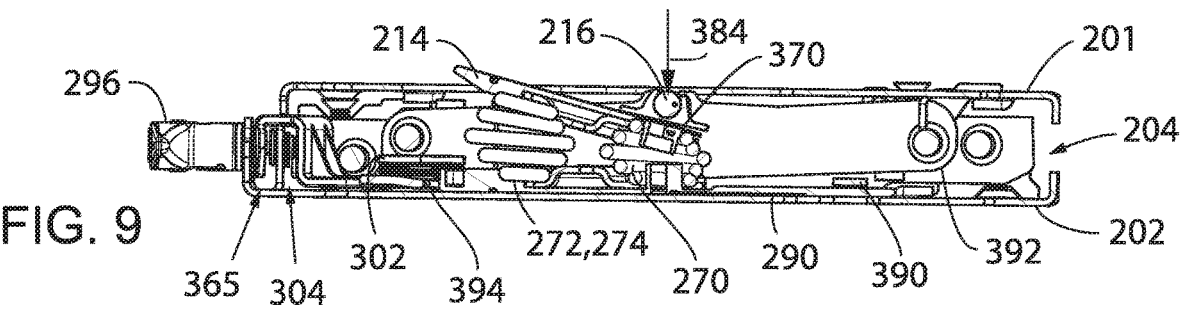

Referring to FIGS. 3, 8, and 9, when oriented for a minimum weight response operation, it should be appreciated that the axis associated with cross member 216 is oriented generally over rearward oriented spring 270 associated with spring assembly 214. Springs 272, 274 are generally aligned with one another in a lateral direction and oriented forward of spring 270 and forward of the axis associated with cross member 216. Manipulation of the orientation or position of spring assembly 214 relative to cross member 216 manipulates the proportion of the springs 270, 272, 274 that can be engaged to resist the downward directed translation of a seat supported by seat mount system 200.

As shown in FIG. 9, when seat assembly 350 is subjected to a load indicated by arrow 384 and configured for the lowest available proportion of engagement of spring assembly 214, cross member 216 translates in a substantially downward direction thereby compressing spring 270 upon collapse or vertical retraction associated with the pivotable connection of scissor assembly 204 relative to upper frame 201 and lower frame 202. Said another way, only rearward oriented spring 270 substantially contributes to resisting downward compression 384 of upper housing 201 relative to lower housing 202 whereas springs 272, 274 are substantially offset forward therefrom.

Figure 10:
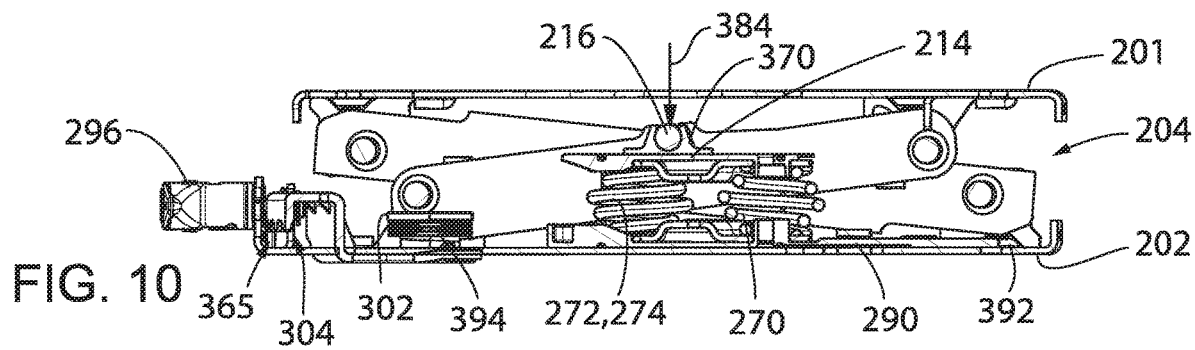

Referring to the orientation shown in FIG. 10, when more resistance to vertical translation is desired, operator manipulation of handle 296 effectuates rotation of driven element 298 relative to lower frame 202 and thereby rearward translation, indicated by arrow 386, of spring assembly 214 relative to upper frame 201 and lower frame 202 as well as cross member 216 associated with scissor assembly 204. The more rearward positioning of spring assembly 214 relative to upper frame 201, lower frame 202, and cross member 216 provides engagement of a greater proportion of spring assembly 214 to resist the relative downward translation or compression of seat mount assembly 200. It is appreciated that the relative forward/aft translation of spring assembly 214, or the direction associated with the translation of spring assembly 214 to respectively increase or decrease the proportion of the spring assembly 214 engaged during operation could be conveniently reversed from the orientation disclosed above.

Figure 11:
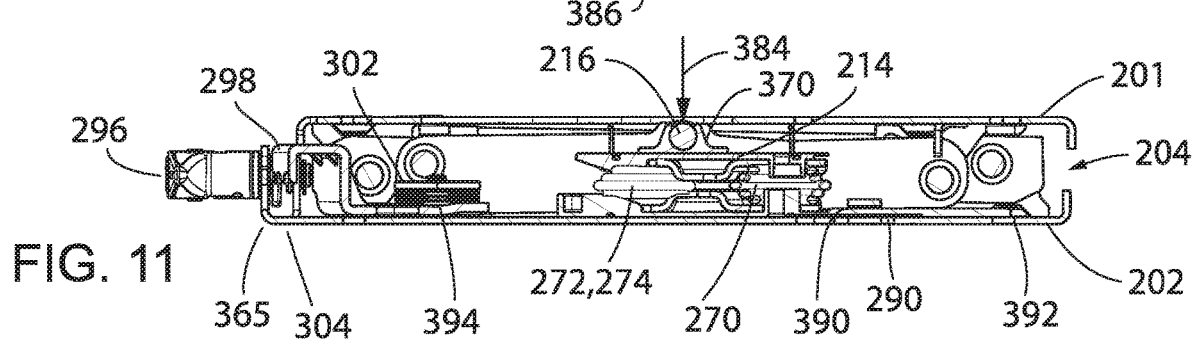

When oriented to engage the maximum available compression resistance, as shown in FIG. 11, cross member 216 associated with scissor assembly 204 is positioned relative to springs 270, 272, 274 such that each of springs 270, 272, 274 act to equally resist load 384 associated with compression of scissor assembly 204. Fore and aft translation of spring assembly 214 relative to the impinging structure associated with scissor assembly 204 allows the user incremental adjustment associated with the portion of spring assembly 214 that is engaged to resist the downward directed compression of seat mount assembly 200.

In a preferred embodiment, lower frame 202 includes one or more tangs, chases, barbs, or channels 390, 392 that are shaped and oriented to cooperate with carriage 290 associated with spring assembly 214 in a manner that does not impinge or otherwise interfere with the desired slidable interaction of carriage 290 relative to lower frame 202 in response to operation of handle 296. Preferably, pivot 302 associated with securing driven element 298 relative to lower frame 202 includes a compression spring 394 or the like that cooperates with respective portions of pivot 302, driven member 298, and/or carriage 290 so as to maintain a desired operational interaction associated with rack and pinion 304, 306 so as to maintain the desired fore and aft relative position of spring assembly 214 relative to cross member 216 and thereby the desired suspension performance associated with seat mount assembly 200 during operation of the underlying vehicle.

Figure 13:
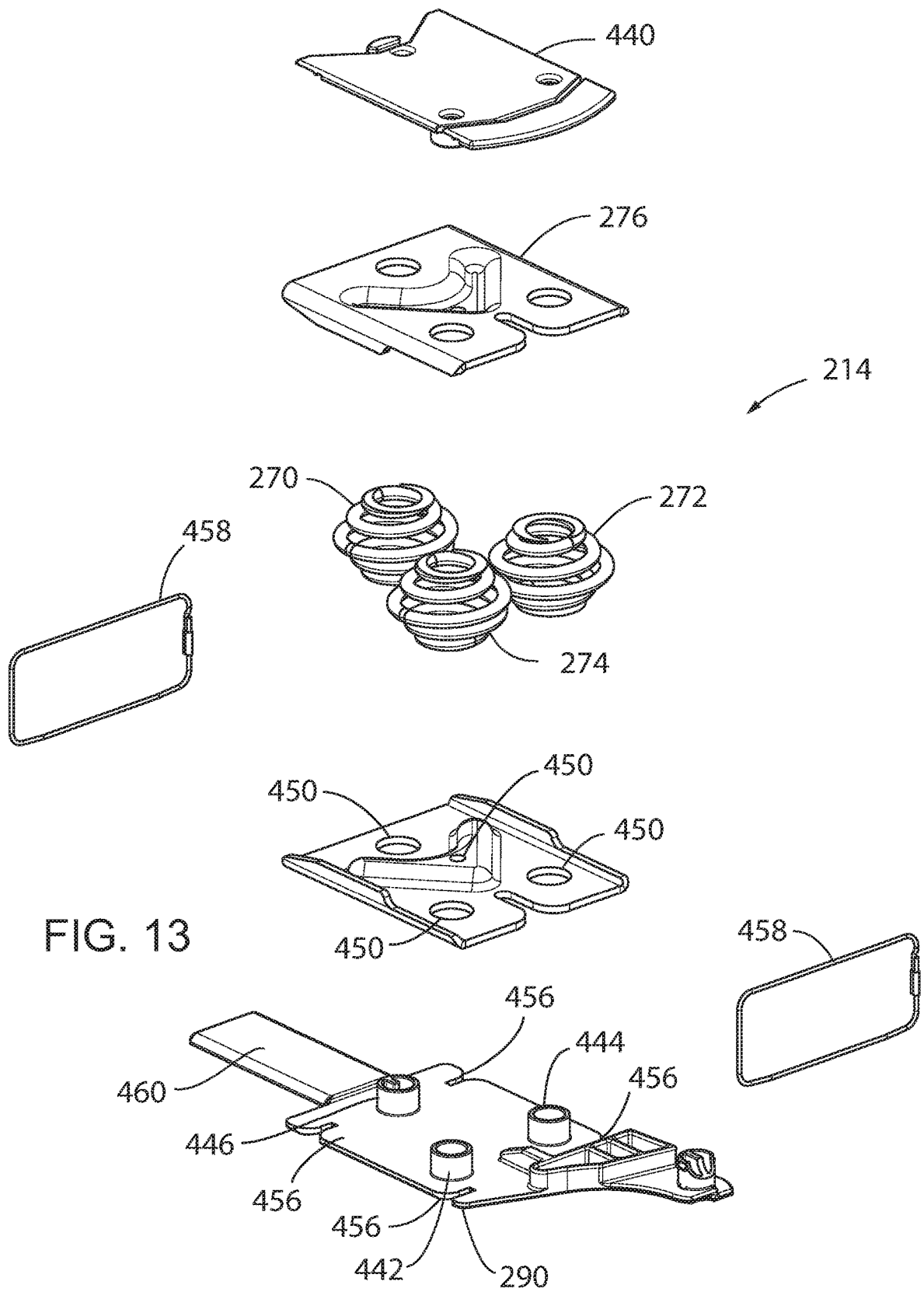
FIG. 13 is an exploded isometric view of a spring module of the seat mount system shown in FIG. 12.

FIGS. 12 and 13 show respective exploded views of seat mount assembly 200 and spring assembly 214. Although referred to with respect to seat assembly 200, it should be appreciated that, aside from the drive arrangement associated with manipulating the orientation of spring assembly 214 relative to upper and lower housings 201, 202, seat mount assembly 200 is substantially similar operationally to seat mount assembly 50.

Referring to FIG. 12, upper frame 201 preferably includes one or more bosses, cavities or projections 400, 402, 404, 406 that are constructed to cooperate and/or otherwise secure respective ones of pivot and/or pivot and slide blocks 224, 226, 266, 268 relative to a seat facing side 408 of upper frame 201. Each respective pivot and slide block 410, and a corresponding bearing 412, is constructed to secure the respective post or sliding end 414 of first scissor arm 206 relative to pivot and slide blocks 224, 226 and the respective slide post 416 associated with the rearward oriented end of first scissor arm 206 relative to the corresponding pivot and slide block 420 secured to lower housing 202.

Respective pivot blocks 422 are secured to lower housing 202 and constructed to pivotably cooperate with respective posts 424 associated with the opposing lateral ends of second scissor arm 208 of scissor assembly 204 associated with the forward end thereof. Corresponding posts 430 associated with the rearward facing end of second scissor arm 208 pivotably cooperate with pivot blocks 266, 268 secured to upper housing 201. Such considerations accommodate the selective pivotable and/or pivotable and slidable securing of the respective ends of the respective scissor arms to the respective upper and lower housings associated with seat mount system 200.

It should be appreciated that whereas each of the opposing ends associated with respective scissor arms 206, 208 of scissor assembly 204 are pivotable relative to the respective mount blocks 224, 226, 266, 268, 420, 422 associated with the discrete respective one of upper housing 201 and lower housing 202, mount arrangements associated with the opposing lateral ends of first scissor arm 206 are also supported in a manner wherein the respective ends are slidable relative to the respective upper housing 201 and lower housing 202 to which they are secured, respectively. Such considerations accommodate the changes in the fore and aft contraction and expansion associated with the scissor assembly during extension and retraction of the discrete arms of the scissor assembly 204 during the vertical translation of upper housing 201 relative to lower housing 202 during use of seat mount assembly 200.

Referring to FIG. 13, it is envisioned that each of spring assembly 58 and spring assembly 214 can be provided in a cartridge form to mitigate the time and resources associated with manufacture, assembly and/or service of a corresponding seat mount assembly, such as seat mount assembly 200, with which it is to be engaged. Additionally, seat mount assemblies 50, 200 have been shown to have been 10-20% total fewer parts associated with comparable low profile seat mount assemblies thereby presenting additional benefits to the manufacturing and service processes. Preferably, springs 270, 272, 274 are captured between an upper spring plate 276 and a lower spring plate 278 that are formed of a metal material. It is further appreciated that one or more of spring plates 276, 278 can include an indexing system configured to provide an indicia as to the orientation of springs 270, 272, 274 relative thereto during assembly and/or to provide a seat associated with the opposing ends of the discrete springs once assembled.

A slide plate 440 preferably cooperates with the upwardly oriented steel upper spring plate 276 and is constructed to accommodate slidable association with saddle or slide 370 disposed thereacross. In a preferred embodiment, carriage 290 preferably includes one or more bosses 442, 444, 446 that extend in a generally upward direction and pass through corresponding openings 450 formed in spring plate 278. Bosses 442, 444, 446 provide an indication as to the desired assembly arrangement associated with spring assembly 214 and provide the desired opposing spring end mounts associated with the respective ends of springs 272, 274, 270 when upper spring plate 276 and lower plate 278 are associated therewith.

Carriage 290 preferably includes one or more channels 456 associated with an exterior perimeter thereof. Channels 456 are constructed to cooperate with a tether or band 458 associated with circumscribing spring assembly 214 to maintain the desired assembly of spring assembly 214 in a cartridge form. It is appreciated that spring assemblies 58, 214 could be constructed to cooperate with various springs having various deflection characteristics or spring constants (K) or bands of different lengths to define a preload characteristic or suspension performance of the resultant spring assembly. Carriage 290 preferably includes a projection 460 that extends in a generally rearward direction therefrom is constructed to cooperate with the one or more bosses, tangs, or projections, or channels 390 defined by lower frame 202 to provide the slidable cooperation between spring assembly 214 therewith while maintaining the desired fore and aft alignment therebetween.

Figure 14:
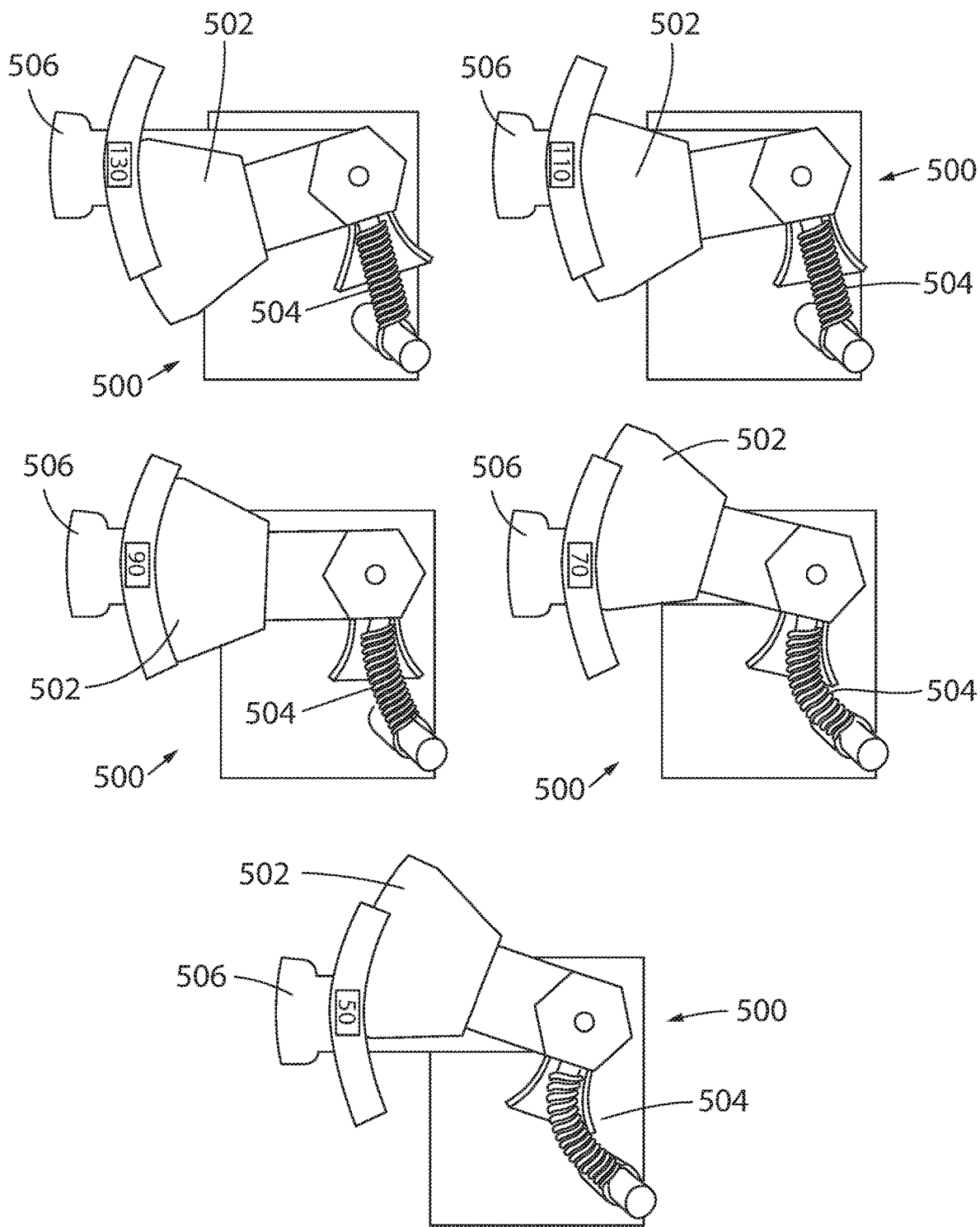
FIG. 14 includes various top plan views of an alternate spring position adjuster assembly useable with one or more of the seat mount assemblies show in FIGS. 1-4.

FIG. 14 shows various views of yet another aspect of the present invention wherein, rather than the rigid rotatable and/or slidable drive arrangements associated with systems 50, 200, or the rack and pinion drive arrangement associated therewith as disclosed above with respect to seat mount system 200, a sprung bell crank arrangement 500 is provided to effectuate the desired translation of a respective spring assembly module or spring cartridge relative to an underlying seat mount assembly in a manner in accordance with and comparable to those arrangements disclosed above. When provided in such a configuration, the orientation shown in the upper left image represents the at-rest or unloaded orientation of the biasing device or spring 504 of the bell crank arrangement 500 wherein the lower image represents the highest potential energy condition of the spring 504. Like the adjustment mechanism disclosed above with respect to seat mount system 200, sprung bell crank arrangement 500 includes a handle 506 having a pinion that rotationally cooperates with a rack defined by portion of the bell crank 502 and whose rotation manipulates the relative bias associated with spring 504. Bell crank 502 and spring 504 cooperate with handle 506 to urge a respective spring assembly 58, 214 associated therewith toward a desired relative position with respect to an underlying seat mount assembly.

Biasing device 504 operates to urge the driven element 502, and a spring assembly connected thereto, relative to the underlying vehicle seat mount assembly during dynamic operation after "selection" of a desired operator mass setting while seated and when the spring assembly is prevented from movement. During operation of the underlying vehicle, biasing device 504 urges the respective spring assembly 58, 214 associated therewith to the desired proportion of engagement that correlates to the setting associated with the respective setting of the sprung bell crank arrangement 500.

Although spring assemblies 58, 214 are axially or linearly movable relative to the underlying seat mount assembly in a fore/aft direction to manipulate the proportion of the respective spring assembly 58, 214 that is available to be engaged to resist compression of the respective seat mount assembly, other methodologies are envisioned to effectuate translation of a respective spring assembly 58, 214 relative to the relative movable structures of a seat mount assembly to facilitate adjustment of the proportion of the respective spring assembly 58, 214 that is available to be engaged to resist downward motion of the seat assembly due to the mass of an intended user. It is appreciated that spring assemblies 58, 214 may be supported by the underlying seat mount assembly in a manner that provides linear, axial, rotational, or rotational and translational motion of the respective spring assembly 58, 214 relative to the underlying seat mount assembly to provide engagement of multiple different desired proportions of the respective spring assembly to accommodate the mass of different users.

Regardless of the specific orientation and/or construction of the respective adjustment assembly and/or spring assembly and the modality employed to effectuate the desired translation of the spring assembly relative to the respective scissor assemblies, each of seat mount systems 50, 200 provide a seat mount arrangement that accommodates a low vertical profile associated with implementation of the seat mount system, limits fore and aft translation of the seat relative to the vehicle during operation of the suspension, and provides an incrementally or continuously adjustable proportional engagement of the spring assembly within the range of provided by the respective spring assembly. Accordingly, each of seat mount systems 50, 200 satisfy the various and occasionally conflicting needs associated with providing such systems and provide seat mount systems that are suitable for use in various applications and can satisfy the demands or preferences of a variety of users.

Accordingly, one aspect of the present application discloses a seat mount assembly having a lower housing constructed to be secured to a vehicle frame member and an upper housing constructed to be secured to a seat secured to the vehicle. An asymmetric scissor assembly having a first scissor bracket is pivotally secured to a second scissor bracket wherein opposing ends of the first scissor bracket and the second scissor bracket are secured to a respective one of the lower housing and the upper housing. A spring assembly is disposed within a footprint of the asymmetric scissor assembly and is moveable relative to the asymmetric scissor assembly to manipulate a proportion of the spring assembly that is engaged to resist translation of the first scissor bracket relative to the second pivot bracket.

Another aspect disclosed in the present application includes a low profile adjustable seat mount system having a vehicle facing mount plate, a seat facing mount plate, and a first pivot bracket and a second pivot bracket that are disposed between the vehicle facing mount plate and the seat facing mount plate and pivotably connected to one another to define a pivot axis that is oriented proximate a middle portion each of the first pivot bracket and the second pivot bracket. A spring assembly is disposed between at least one of the vehicle facing mount plate and the seat facing mount plate and at least one of the first pivot bracket and the second pivot bracket and configured to resist motion in at least one direction between the first pivot bracket and the second pivot bracket. An adjuster is engaged with the spring assembly and configured to manipulate a position of the spring assembly in response to operation of the adjuster.

A further aspect of the present application is directed to a method for forming a low-profile seat mount assembly that includes providing a first scissor arm and a second scissor arm that are securable to respective opposite fore/aft ends of a seat mounting plate. The first scissor arm and the second scissor arm are connected to one another such that the first scissor arm and the second scissor arm are securable to respective opposite fore/aft ends of a vehicle mounting plate and such that the first scissor arm and the second scissor arm are oriented in a crossing orientation relative to the one another with respect to a lateral side elevation of the first scissor arm and the second scissor arm. The method provides a spring cartridge that modulates translation performance between the first scissor arm and the second scissor arm and is configured to be disposed therebetween. An adjuster assembly is provided that cooperates with the spring cartridge and is operable to manipulate a position of the spring cartridge relative to the first scissor arm and the second scissor arm.

Another aspect discloses an adjustable performance seat mounting system wherein the seat mounting system has a lower housing that is constructed to be secured to a vehicle frame member. An upper housing is constructed to be secured to a seat secured to the vehicle. A spring assembly is disposed between the upper housing and the lower housing and an adjuster assembly is connected to the spring assembly and configured to manipulate a position of the spring assembly relative to the upper housing and the lower housing to change a proportion of the spring assembly that contributes to resisting motion between the lower housing and the upper housing.

A further aspect includes a method of forming an adjustable vehicle seat mount assembly that includes providing an upper plate that is configured to be secured to an underside of a seat and providing a lower plate that is configured to be secured to a vehicle. A spring assembly is provided that is configured to be disposed between the upper plate and the lower plate and is secured relative to the upper plate and the lower plate such that the spring assembly is movable relative to at least one of the upper plate and the lower plate such and movement of the spring assembly adjusts a proportion of the spring assembly that is engaged during loading of the upper plate.

It is understood that, although the foregoing description and drawings describe and illustrate in detail one or more preferred embodiments of the invention, to those skilled in the art to which the invention relates, the aforementioned disclosure will suggest many modifications and constructions as well as widely differing embodiments and applications without departing from the spirit and scope of the claimed invention.

What is claimed is:

1. A seat mount assembly comprising:
    a lower housing constructed to be secured to a vehicle frame member;
    an upper housing constructed to be secured to a seat secured to the vehicle;
    an asymmetric scissor assembly having a first scissor bracket that is pivotably secured to a second scissor bracket wherein opposing ends of the first scissor bracket and the second scissor bracket are secured to a respective one of the lower housing and the upper housing; and
    a spring assembly disposed within a footprint of the asymmetric scissor assembly and including at least one biasing device, the spring assembly being translatable relative to the asymmetric scissor assembly to manipulate a location of the at least one biasing device relative to a point of incidence between the spring assembly and the asymmetric scissor assembly to manipulate a proportion of the at least one biasing device of the spring assembly that is engaged therewith and available to resist translation of the first scissor bracket relative to the second scissor bracket and a remaining proportion of the at least one biasing device is configured to contribute a greater or lesser amount of resistance to the proportion of the at least one biasing device upon translation of the spring assembly.

2. The seat mount assembly of claim 1 wherein the spring assembly includes a plurality of biasing devices.

3. The seat mount assembly of claim 2 wherein translation of the spring assembly translates both ends of a respective one of the plurality of biasing devices relative to the asymmetric scissor assembly.

4. The seat mount assembly of claim 2 wherein the plurality of biasing devices are further defined as a plurality of compression springs.

5. The seat mount assembly of claim 1 further comprising an adjustment assembly attached to one of the lower housing and the upper housing and configured to effectuate translation of the spring assembly to manipulate a position of the spring assembly relative to the asymmetric scissor assembly.

6. The seat mount assembly of claim 5 wherein the adjustment assembly is further defined as one of a rack and pinion assembly and a rack and bell crank assembly.

7. The seat mount assembly of claim 1 wherein one of the first scissor bracket and the second scissor bracket includes a crossbar that is oriented to act upon the spring assembly.

8. The seat mount assembly of claim 1 wherein the spring assembly is further defined as a spring cartridge that is disposed between the lower housing and the upper housing.

9. The seat mount assembly of claim 8 wherein the spring cartridge further comprises at least one tether configured to capture the at least one biasing device between an upper spring plate assembly and a lower spring plate assembly.

10. The seat mount assembly of claim 8 wherein at least one of the upper spring plate assembly and the lower spring plate assembly includes a plastic spring plate and a metal spring plate disposed between the plastic spring plate and the at least one biasing device of the spring cartridge.

11. The seat mount assembly of claim 1 further comprising a handle that extends in a forward direction from the spring assembly and is operable to adjust a position of the spring assembly relative to the asymmetric scissor assembly.

12. The seat mount assembly of claim 1 wherein translation of the spring assembly is further defined as rotation of the spring assembly about a vertical axis relative to the asymmetric scissor assembly.

13. The seat mount assembly of claim 1 wherein translation of the spring assembly is further defined as moving the spring assembly in a fore and aft direction relative to the asymmetric scissors assembly.

14. The seat mount assembly of claim 1 wherein the lower housing comprises one of a lower mount frame and a lower mount plate, and wherein the upper housing comprises one of an upper mount frame and a upper mount plate.

15. The seat mount assembly of claim 1 further comprising an adjustment assembly in operable cooperation with (a) the spring assembly and (b) one of the lower housing and the upper housing, the adjustment assembly comprised of one of a rack and pinion assembly and a bellcrank assembly, and the adjustment assembly configured to translate the spring assembly relative to the asymmetric scissor assembly between a plurality of pairs of weight adjust positions.

16. The seat mount assembly of claim 15 wherein the asymmetric scissor assembly comprises first and second pairs of pivotally connected scissor arms disposed between the upper housing and the lower housing, wherein one of the first and second pairs of the pivotally connected scissor arms are laterally spaced apart from the other one of the first and second pairs of pivotally connected scissor arms, wherein the adjustment assembly and the spring assembly are disposed between the upper housing and the lower housing, and wherein the adjustment assembly and the spring assembly are disposed interjacent the first and second pairs of pivotally connected scissor arms.

17. The seat mount assembly of claim 16 wherein the spring assembly is comprised of three biasing devices disposed interjacent an upper spring plate and a lower spring plate.

18. The seat mount assembly of claim 17 wherein each one of the biasing devices comprises a spring captured in compression between the upper spring plate and the lower spring plate.

19. A seat mount system, the seat mount system comprising:
    a vehicle facing mount plate constructed to be secured to a vehicle frame member;
    a seat facing mount plate constructed to secure a seat to the vehicle frame member;
    a first pivot bracket and a second pivot bracket disposed between the vehicle facing mount plate and the seat facing mount plate and pivotably connected to one another to define an asymmetric scissor assembly and having a pivot axis that is oriented proximate a middle portion each of the first pivot bracket and the second pivot bracket;
a spring assembly disposed between at least one of the vehicle facing mount plate and the seat facing mount plate and at least one of the first pivot bracket and the second pivot bracket and configured to resist motion in at least one direction between the first pivot bracket and the second pivot bracket; and
an adjuster engaged with the spring assembly and configured to manipulate a position of the spring assembly in response to operation of the adjuster to adjust a proportion of the spring assembly that is available to resist motion in the at least one direction between the first pivot bracket and the second pivot bracket and a remaining proportion of the spring assembly is configured to contribute a greater or lesser amount of resistance to the proportion of the spring assembly upon translation of the spring assembly.

20. The seat mount assembly of claim 19 wherein the adjuster is further configured to move the spring assembly in one of a linear direction and a rotational direction.

21. The seat mount assembly of claim 20 wherein the adjuster further comprises at least one of a rack and pinion drive arrangement and a rotational and translatable drive arrangement.

22. The seat mount assembly of claim 19 wherein the spring assembly is further defined as a cartridge that includes at least one biasing device that is supported by a housing.

23. The seat mount assembly of claim 22 wherein the housing is further defined as a plurality of plate ends and a tether configured to restrain the plurality of plate ends relative to one another with the at least one biasing device captured therebetween.

24. The seat mount assembly of claim 19 wherein the adjuster defines a plurality of preset positions of the spring assembly relative to the seat mount assembly.

25. The seat mount assembly of claim 19 further comprising a crossbar secured to one of the first pivot bracket and the second pivot bracket and oriented to engage the spring assembly.

26. A seat mount assembly comprising:
a lower housing constructed to be secured to a vehicle frame member;
an upper housing constructed to be secured to a seat secured to the vehicle;
an asymmetric scissor assembly having a first scissor bracket that is pivotably secured to a second scissor bracket wherein opposing ends of the first scissor bracket and the second scissor bracket are secured to a respective one of the lower housing and the upper housing;
a spring assembly defined as a spring cartridge having an upper spring plate assembly and a lower spring plate assembly and that is disposed between the lower housing and the upper housing and disposed within a footprint of the asymmetric scissor assembly, the spring assembly being moveable relative to the asymmetric scissor assembly to manipulate a proportion of the spring assembly that is engaged to resist translation of the first scissor bracket relative to the second pivot bracket; and
wherein at least one of the upper spring plate assembly and the lower spring plate assembly includes a plastic spring plate and a metal spring plate disposed between the plastic spring plate and the at least one spring of the spring cartridge.

27. A seat mount assembly comprising:
a lower housing constructed to be secured to a vehicle frame member;
an upper housing constructed to be secured to a seat secured to the vehicle;
an asymmetric scissor assembly having a first scissor bracket that is pivotably secured to a second scissor bracket wherein opposing ends of the first scissor bracket and the second scissor bracket are secured to a respective one of the lower housing and the upper housing;
a spring assembly disposed within a footprint of the asymmetric scissor assembly, the spring assembly being translatable relative to the asymmetric scissor assembly to manipulate a proportion of the spring assembly that is engaged therewith to resist translation of the first scissor bracket relative to the second pivot scissor bracket; and
wherein translation of the spring assembly is further defined as rotation of the spring assembly about a vertical axis relative to the asymmetric scissor assembly.

28. The seat mount assembly of claim 27 wherein the spring assembly includes at least one of a plurality of biasing devices and a plurality of biasing devices that are further defined as a plurality of compression springs.

29. The seat mount assembly of claim 27 further comprising an adjustment assembly attached to one of the lower housing and the upper housing and configured to effectuate translation of the spring assembly to manipulate a position of the spring assembly relative to the asymmetric scissor assembly.

30. The seat mount assembly of claim 29 wherein the adjustment assembly is further defined as one of a rack and pinion assembly and a rack and bell crank assembly.

31. The seat mount assembly of claim 27 wherein one of the first scissor bracket and the second scissor bracket includes a crossbar that is oriented to act upon the spring assembly.

32. The seat mount assembly of claim 27 wherein the spring assembly is further defined as a spring cartridge that is disposed between the lower housing and the upper housing.

33. The seat mount assembly of claim 32 wherein the spring cartridge further comprises at least one tether configured to capture the at least one spring biasing device between an upper spring plate assembly and a lower spring plate assembly.

34. The seat mount assembly of claim 33 wherein at least one of the upper spring plate assembly and the lower spring plate assembly includes a plastic spring plate and a metal spring plate disposed between the plastic spring plate and the at least one spring biasing device of the spring cartridge.

35. The seat mount assembly of claim 27 further comprising a handle that extends in a forward direction from the spring assembly and is operable to adjust a position of the spring assembly relative to the asymmetric scissor assembly.

* * * * *